Patented Aug. 19, 1952

2,607,765

UNITED STATES PATENT OFFICE 2,607,765

REACTION OF POLYVINYL ALCOHOL WITH BORIC ACID

Edward P. Czerwin, Niagara Falls, and Lynden D. Martin, Grand Island, N. Y., assignors to E. I. du Pont de Nemours & Company, Wilmington, Del., a corporation of Delaware No Drawing. Application December 5, 1949, Serial No. 131,255

5 Claims. (Cl. 260—91.3)

This invention relates to compositions for sizing textile yarns, fibers and the like, and more particularly to sizing compositions containing polyvinyl alcohol.

Aqueous solutions containing polyvinyl alcohol, with or without other conventional ingredients are used to size various types of yarn prior to knitting or weaving. The polyvinyl alcohol size compositions are particularly valuable for sizing nylon yarn prior to knitting. Particularly useful are those polyvinyl alcohol solutions to which boric acid has been added as described, for example, in Spanagel U. S. P. 2,324,601. Such sizing solutions are prepared by adding aqueous boric acid solution to an aqueous solution of polyvinyl alcohol which solution may also contain, if desired, other ingredients such as those mentioned in the above mentioned patent.

It has been desired to produce and market a solid polyvinyl alcohol composition which can be shipped to the point of use and there dissolved in water to form a sizing composition containing polyvinyl alcohol and boric acid. For this purpose, a mixture of granular polyvinyl alcohol and crystalline or powdered boric acid is not suitable, since in movements incident to shipping and handling, the boric acid crystals tend to settle out, so that the product arrives at the point of use in non-uniform condition. Further, we have found that size solutions prepared by dissolving in water mixtures of polyvinyl alcohol and boric acid crystals do not have uniform viscosities, from batch to batch; and that the viscosity of a solution so prepared is generally lower than that of one made by mixing aqueous solutions of polyvinyl alcohol and boric acid in the same proportions. Tests have shown that when the solid materials are simultaneously dissolved together, the boric acid does not completely react, whereas on mixing solutions of the two ingredients, complete reaction occurs.

Preparation of a satisfactory product by adding boric acid to an aqueous solution of polyvinyl alcohol followed by dehydration has proved to be impracticable. As dehydration proceeds, the boric acid reacts with the polyvinyl alcohol to form a gelatinous mass, from which water can be removed only exceedingly slowly, even under reduced pressure, unless considerable heat is applied. If the material is heated during the drying operation, the resulting product is water-insoluble and cannot be dissolved to make a sizing solution. Further, in order to form a useful and saleable product, the gelatinous mass, if successfully dried, must be ground to produce a free-flowing granular material.

An object of the present invention is to produce a new and useful sizing composition. A further object is to produce a novel, dry, particulate (granular or pulverulent), solid, homogeneous product, containing polyvinyl alcohol and an amount of boric acid up to 40% by weight of the polyvinyl alcohol, which product is soluble in water to form aqueous solutions suitable for sizing textile fibers. Still other objects will be apparent from the following description of the invention.

The aforesaid objects may be attained, in accordance with the present invention, by dispersing a finely divided solid, water-soluble, polyvinyl alcohol, together with finely divided boric acid, in a liquid in which they are insoluble and then adding a small amount of water. The liquid dispersant may or may not be one which is miscible with water. If the water is insoluble therein, the water is likewise dispersed throughout the liquid. The addition of the water causes the formation of a granular material, which precipitates and which is then removed from the liquid and dried at a low temperature.

The product is a novel, free-flowing, finely divided, solid material which contains polyvinyl alcohol having chemically combined therewith substantially all of the boric acid added. By this means it is possible to produce granular, water-soluble compositions containing as high as around 30% by weight of boric acid.

The following example illustrates a preferred mode of practicing the invention:

*Example*

Powdered polyvinyl alcohol of about 40 mesh size is dispersed in an equal weight of acetone by stirring the mixture. Finely divided solid boric acid (from 20 to 100 mesh size) in amount equal to about 20% by weight of the polyvinyl alcohol then is dispersed into the mixture, with continued stirring. An amount of water equal to about 5–10% of the weight of the acetone is then added, with continued sitrring. The addition of the water causes the formation of a finely divided solid material, which forms a thick slurry with the acetone. The acetone is then removed by filtration and the remaining solid product (filter cake) is dried at room temperature. Preferably, the filter cake is stirred while drying, in order to obtain a free-flowing, finely divided material. If the acetone is completely evaporated without stirring, the solid particles tend to cohere, forming a solid mass or cake. Such solid mass, however, is very friable and easily broken into a finely divided, free-flowing pulverulent or granular product by crushing or grinding.

The resulting solid product contains boric acid in chemical combination, as prolonged extraction of a sample with methanol fails to yield any boric acid-containing extract. The product is readily soluble in water, the water solubility at room temperature being substantially the same as that of the original polyvinyl alcohol. Aqueous solutions of the product, when used as a textile size, were found to give the same results as sizing compositions made by adding an aqueous solution of boric acid to an aqueous solution of polyvinyl alcohol.

In place of the acetone used in the above example any organic liquids which neither dissolve in or react with polyvinyl alcohol and boric acid, or mixtures of such liquids, may be used as dispersing liquids. Examples of suitable dispersing liquids, in addition to acetone, are: methyl acetate and other low molecular weight fatty acid esters; vinyl acetate, methyl ethyl ketone, diethyl ether, trichlorethylene, tetrachlorethane and carbon tetrachloride, benzene, toluene, gasoline and kerosene. The chemical nature of the dispersing liquid is immaterial so long as it is substantially chemically inert towards the polyvinyl alcohol and boric acid and it is substantially a non-solvent for both the polyvinyl alcohol and the boric acid. It is immaterial whether the dispersing liquid is miscible or non-miscible with water. Liquids such as water or glycerol, which dissolve or soften polyvinyl alcohol, are not suitable. Likewise, alcohols such as methanol, which are non-solvents for polyvinyl alcohol but are solvents for boric acid are not suitable dispersing liquids. For example, when methanol is used as the dispersing liquid, the boric acid added does not completely react and the product is not a finely divided solid, but forms as a large gelatinous mass.

The substance chosen as dispersing liquid may be a single compound or a mixture of two or more. It must, of course, be liquid at the reaction temperature and should have sufficient volatility so that it may readily be removed from the product by evaporation. Preferably the liquid should have a low viscosity, i. e. a viscosity not greatly exceeding that of water. However, high viscosity liquids may be used, providing means are employed to rapidly and thoroughly stir the reaction mixture when the water or equivalent precipitant is added.

The amount of boric acid used may vary over a wide range, depending primarily on the amount of boric acid desired in the product, and generally will be within the range of about 5 to 40% of the weight of the polyvinyl alcohol. The maximum amount of boric acid which can be reacted in our process to yield a water-soluble product will depend on the particular grade of polyvinyl alcohol employed. Most of the water-soluble grades of polyvinyl alcohol now commercially available will yield a water-soluble product when the amount of boric acid reacted is around 20 to 25% of the weight of the polyvinyl alcohol. With such grades, a larger amount of boric acid will react, but the product will not be water-soluble. Some grades of polyvinyl alcohol will tolerate higher proportions of boric acid, up to about 30% of the weight of the polyvinyl alcohol, producing water-soluble products. If desired, products containing less than 5% of boric acid may be made by using a correspondingly smaller amount of the acid. In carrying out the reaction by our herein described method, the amount of boric acid reacted generally equals, or closely approximates, the amount added to the dispersion of polyvinyl alcohol in the organic liquid, provided that the proportion of boric acid is within that indicated above.

If desired, the boric acid may first be dispersed in the dispersing liquid, followed by dispersion of the polyvinyl alcohol, or the polyvinyl alcohol and boric acid may be dispersed simultaneously, without materially affecting the results. However, to obtain a homogeneous, completely water-soluble product, the water must be added only after both the polyvinyl alcohol and boric acid have been dispersed in the liquid. If the water is added prior to, or simultaneously with, the other two ingredients, the resulting product will not have the desired water-solubility.

While the invention is adapted to produce a finely divided, solid water-soluble product, it may also be utilized to produce particulate, water-insoluble products by using a sufficiently large proportion of boric acid. The proportion of boric acid required to produce an insoluble product will depend on the nature of the polyvinyl alcohol reacted. If the polyvinyl alcohol originally is water-insoluble, it will form a water-insoluble product with any desired amount of boric acid. If it is originally water-soluble, the least amount of boric acid required to form an insoluble product is easily determined by a succession of trials, using different amounts of boric acid. In most cases a water-soluble polyvinyl alcohol will require around 25 to 50% of its weight of boric acid to produce a water-insoluble product. Still larger amounts of boric acid generally may be reacted, if desired, depending on the nature of the polyvinyl alcohol. The maximum amount, in any case will correspond to the proportion one mole of boric acid to two moles of each vinyl alcohol unit (—$CH_2$—CHOH—) in the polyvinyl alcohol.

In operating the process to make a particulate, water-insoluble product, the mode of procedure is the same as for the soluble product, except that high temperatures may be used, if desired, both for the reaction and for drying the granular product.

The various known water-soluble grades of polyvinyl alcohol may be used; and the term "water-soluble polyvinyl alcohol" is used herein and in the appended claims to mean any water-soluble polymer or copolymer of vinyl alcohol, including the water-soluble hydrolysis products of polymers and copolymers of polyvinyl esters, whether partially or completely hydrolyzed, and derivatives such as the water-soluble partial esters, ethers and acetals of polyvinyl alcohol.

The amount of water added to the dispersion to cause the precipitation of the particulate polyvinyl alcohol boric acid compound may vary from about 1 to 20% of the weight of the polyvinyl alcohol. Generally, 5 to 10% of water is sufficient to effect substantially complete precipitation. In any case, the water preferably should not exceed about 20% of the weight of the polyvinyl alcohol in order to obtain a product best suited for sizing synthetic yarns such as nylon. Still larger amounts of water may be used, but only provided that the amount of dispersing liquid (e. g. acetone) is correspondingly increased, so that the amount of water does not exceed about 20% of the weight of the dispersing liquid. If the amount of water exceeds that specified above, the reaction tends to form a gelatinous mass instead of the desired precipitate of a finely divided water-soluble material.

If desired, solvents for boric acid other than water, for example, lower alcohols such as methanol or ethanol, may be used in place of water to precipitate the product. With such other precipitants, the conditions employed, including temperature and amount of precipitant added, are substantially the same as for the employment of water as precipitant.

In dispersing the polyvinyl alcohol in the non-solvent liquid, the polyvinyl alcohol concentration may be varied over a wide range, for example, from 10 to 150% by weight, of the weight of the dispersing liquid. That is, we may use from about 0.66 to 10 parts by weight of the liquid for each part by weight of the polyvinyl alcohol. Generally, we prefer to use approximately equal parts by weight of the polyvinyl alcohol and the dispersing liquid.

The degree of subdivision of the polyvinyl alcohol also may vary over a wide range from an exceedingly fine powder such as 100 mesh or smaller, up to a relatively coarse, granular material such as 10 mesh size. It is generally preferable to use material of around 40 to 80 mesh size. The degree of subdivision of the boric acid added to the dispersion may vary over the same range as that noted above for polyvinyl alcohol. For example, equally good results are obtained using 20 to 30 mesh size boric acid crystals as with finely powdered boric acid of around 100 mesh size or smaller.

The formation of the solid, water-soluble product and the drying thereof preferably are both carried out at temperatures within the range of from about 15 to 30° C. If desired, higher temperatures not exceeding about 100° C., may be employed. If the temperature is permitted to exceed about 100° C., either during the reaction or during separation and drying of the product, a water-insoluble material is formed, which is unsuitable for use as a textile size.

The products of this invention are free-flowing, finely divided solids, composed of particles ranging from 20 to 200 mesh size. They dissolve readily in water to produce clear, aqueous solutions which give excellent results when employed as textile sizing compositions. These water-soluble products are true reaction products, consisting of a chemical combination between the polyvinyl alcohol and boric acid, as evidenced by the fact that no boric acid can be removed therefrom by leaching with a boric acid solvent, such as anhydrous methanol.

We claim:

1. The process which comprises dispersing a finely divided polyvinyl alcohol and finely divided boric acid in an organic liquid in which both are insoluble and adding a boric acid solvent to the resulting dispersion in amount sufficient to cause the formation of a particulate reaction product.

2. The process which comprises dispersing a finely divided, solid, water-soluble polyvinyl alcohol and finely divided boric acid in an organic liquid in which both are substantially insoluble, adding to the resulting dispersion an amount of water equal to about 1 to 20% by weight of the dispersed polyvinyl alcohol and separating from said liquid the resulting particulate reaction product.

3. The process which comprises dispersing a finely divided, solid, water-soluble polyvinyl alcohol and finely divided boric acid in an organic liquid in which both are substantially insoluble, the proportion of boric acid being less than that which will form a water-insoluble reaction product, adding to the resulting dispersion an amount of water equal to about 1 to 20% by weight of the dispersed polyvinyl alcohol and separating from said liquid the resulting particulate, water-soluble reaction product.

4. The process which comprises dispersing a finely divided, solid, water-soluble polyvinyl alcohol and finely divided boric acid in an organic liquid in which both are substantially insoluble, the proportion of boric acid being equal to about 5 to 20% by weight of the dispersed polyvinyl alcohol, adding to the resulting dispersion an amount of water equal to about 1 to 20% by weight of the dispersed polyvinyl alcohol and separating from said liquid the resulting particulate, water-soluble reaction product.

5. The process which comprises stirring a finely divided, water-soluble polyvinyl alcohol of about 40 to 80 mesh size, together with finely divided boric acid in amount equal to about 5 to 20% of the weight of the polyvinyl alcohol, into a quantity of substantially anhydrous acetone approximately equal to the weight of the polyvinyl alcohol, to form a dispersion of the polyvinyl alcohol and boric acid in said acetone, then, with continued stirring, adding to said dispersion a quantity of water equal to about 5 to 10% of the weight of the dispersed polyvinyl alcohol, while maintaining the dispersion at a temperature of about 15 to 30° C., separating from the acetone the resulting particulate, water-soluble reaction product and drying said product at a temperature not exceeding about 100° C.

EDWARD P. CZERWIN.
LYNDEN D. MARTIN.

REFERENCES CITED

The following references are of record in the file of this patent:

UNITED STATES PATENTS

| Number | Name | Date |
| --- | --- | --- |
| 2,324,601 | Spanagel | July 20, 1943 |
| 2,326,539 | Irany | Aug. 10, 1943 |
| 2,439,108 | Staehle | Apr. 6, 1948 |
| 2,459,845 | Jefferson et al. | Jan. 31, 1950 |

FOREIGN PATENTS

| Number | Country | Date |
| --- | --- | --- |
| 413,624 | Great Britain | 1934 |

OTHER REFERENCES

Marvel et al., Journal American Chemical Soc., vol. 60, May 1938, pp. 1045, 1046, 1049, 1050, 1051.